United States Patent

Cirri

[11] Patent Number: 5,321,336
[45] Date of Patent: Jun. 14, 1994

[54] ELECTRON GUN DEVICE FOR CONTROLLING THE POTENTIAL OF A BODY IN SPACE

[75] Inventor: Gianfranco Cirri, Florence, Italy

[73] Assignee: Proel Technologie S.p.A., Florence, Italy

[21] Appl. No.: 4,453

[22] Filed: Jan. 14, 1993

Related U.S. Application Data

[63] Continuation of Ser. No. 798,542, Nov. 26, 1991, abandoned.

[51] Int. Cl.[5] .................. H01J 29/46; H01J 29/56
[52] U.S. Cl. .................................... 315/14; 244/158 R
[58] Field of Search ............ 315/14; 244/205, 158 A, 244/158 R

[56] References Cited

U.S. PATENT DOCUMENTS

| 3,733,038 | 5/1973 | Ikrath et al. | 244/1 |
| 3,984,730 | 10/1976 | Hunter | 244/205 |
| 4,549,113 | 10/1985 | Rao | 315/14 |
| 4,824,051 | 4/1989 | Engelking | 244/158 R |

FOREIGN PATENT DOCUMENTS 2590103  5/1987  France .

OTHER PUBLICATIONS

J. Arnold, "Les Instruments de Mesure a bord du satellit FR-1" Board of Scientific Instruments (Journal of Physics E), ser. 2, vol. 1, No. 9, Sep. 1968 pp. 893–901.
R. H. Levy, "Plasma Radiation Shielding" AIAA Journal, vol. 2, No. 10, Oct. 1964 p. 1836.

*Primary Examiner*—Theodore M. Blum
*Attorney, Agent, or Firm*—McGlew and Tuttle

[57] ABSTRACT

The cathode of an electron gun is connected to the body of a space vehicle, performing an automatic limitation (or neutralization) of the negative potential (measured with respect to the physical entity toward which the electron beam is directed, i.e. the anode (A) of the gun, whether this be the environment in which the gun is immersed or a particular object such as a second space vehicle) which the body may assume in the absence of the connection referred to. The aforementioned negative potential is limited or neutralized by means of the extraction of negative charges emitted from the gun (K-E) in the form of an electron beam under appropriate conditions of vacuum. The gun comprises a cathode (K) to be connected to the body (C), at least one accelerating electrode (E), an accelerating voltage generator (G) and a generator (R) for heating the cathode.

11 Claims, 3 Drawing Sheets

ELECTRON GUN DEVICE FOR CONTROLLING THE POTENTIAL OF A BODY IN SPACE

This is a continuation application of application Ser. No. 07/798,542 filed Nov. 26, 1991, now abandoned.

FIELD OF THE INVENTION

The present invention relates in general to controlling an electrical potential of a body, and in particular to a device for emitting electrons from a space vehicle in order to limit the negative electrical potential between the space vehicle and the surrounding environment.

BACKGROUND OF THE INVENTION

Electron guns provide an effective means for expelling from a body, for example from an orbiting space vehicle, the accumulations of negative charge which may come to be formed on said body either as a result of physical phenomena which have already been studied and verified in practice [Henry Berry Garret, THE CHARGING OF SPACECRAFT SURFACES, Reviews of Geophysics and Space Physics, Vol. 19 No. 4, pages 577–616, November 1981], or as a result of experiments and operations carried out by man [NASA, TETHERS IN SPACE HANDBOOK—Second Edition May 1989].

The acquisition (on the part of an orbiting vehicle) of a negative potential with respect to the surrounding environment (in this case understood as being at zero potential) is in many cases an undesirable circumstance. This causes either the possibility of electrical discharges between vehicle and environment, or between vehicles in the docking phase. The electrical discharge can cause damage and/or disturbances to the structures and/or equipment, with particular reference to the electronic equipment, or the impairment of the preexisting environmental conditions (body at zero potential) which can reduce the meaningfulness of particular scientific experiments.

Other devices (such as a plasma contactor) are in current use in the space field for the limitation of the potential of a vehicle with respect to the surrounding environment (plasma). They emit during their operation a plasma formed of ions, electrons and neutral particles of gas (for example Xe, Ar), and their use is accordingly not practicable in cases in which it is desired to minimize the impairment of the pre-existing environmental conditions.

In these cases, it is advantageous to use an electron gun, which emits only electrons and is moreover adjustable by means of the accelerating voltage. By means of this device, it is in fact possible to expel in a controlled and controllable manner from a space vehicle (or more generally, from a body) negative charges and thus to determine the potential thereof. The negative charges are extracted from the vehicle and injected into the surrounding plasma by means of the emission of an electron beam from the gun, which is electrically connected to thee vehicle in an expedient manner. The electron beam emission must take place when the gun is under appropriate vacuum conditions, and may thus advantageously be used in the space field.

The systems employed up to now (FIG. 1) provide the interposition of a feeder G between the cathode K of the gun and the vehicle C (as exemplified in FIG. 1), for the purpose of bringing the cathode K to and maintaining it at a negative potential with respect to the vehicle C. The accelerating electrode or electrodes E are connected to the potential of the vehicle C. In such a configuration, the feeder G is employed to stabilize a potential difference between accelerating electrodes E and cathode K by accelerating the electrons. The feeder G must supply all the electron current emitted by the cathode K. Moreover, the gun-feeder system must be managed by an external intelligence which controls the times of operation thereof and the modes of application thereof, in order to avoid an uncontrolled expulsion of negative charges. Such an uncontrolled expulsion of negative charge might for example even bring the vehicle to positive potentials with respect to the surrounding environment A, and of a level equal to the accelerating potential difference imposed between vehicle and cathode. Such an event, which has already been experienced in practice, again implies the above cited disadvantages (risk of electrical discharges, impairments of physical parameters of the vehicle-environment system).

SUMMARY AND OBJECTS OF THE PRESENT INVENTION

The subject of the invention is a different configuration of the vehicle-gun system, which permits the automatic expulsion from the body towards the anode (which may be the environment) of the surpluses of negative charges, eliminating the need for management of the system by a dedicated intelligence and moreover drastically reducing the power of the feeder which stabilizes the accelerating voltage between the accelerating or each accelerating electrode and the cathode.

The invention thus is a particular manner of using an electron gun to determine the potential of a body, with reference henceforth, on a non-limiting basis, to a space vehicle.

The electron gun of the present invention has the cathode electrically connected to the body. The cathode and the body are at the same electrical potential. The electron gun has an accelerating electrode which is spaced from the cathode. This accelerating electrode is put at a higher positive potential than the cathode by an accelerating voltage means. The high positive voltage on the accelerating electrode draws electrons that have been released by the cathode. These released electrons are moved away from the cathode and away from the body and into the surrounding environment. By removing these electrons, which are negatively charged particles, the negative electrical potential of the body is removed.

Whenever the body is negatively charged compared to the surrounding environment, the cathode is also negatively charged at the same potential with respect to the surrounding environment. The accelerating electrodes throw off electrons from the cathode and into the surrounding environment which is at a more positive potential than the body and the cathode. When the body is at substantially the same potential as the surrounding area the cathode is also at substantially the same potential as the surrounding area. The accelerating electrodes can therefore throw off only a few electrons from the cathode, if any. This prevents the electron gun from throwing off too many electrons from the body insuring that the body will not be at a high positive potential compared to the surrounding environment. Also since the cathode is connected to the body the electrons emitted the cathode do not have to be entirely supplied by an acceleration voltage means. The acceleration voltage means therefore supplies less power than in prior art devices.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

DETAILED DESCRIPTION OF THE PREFERRED EMBODIMENT

Figure 2:
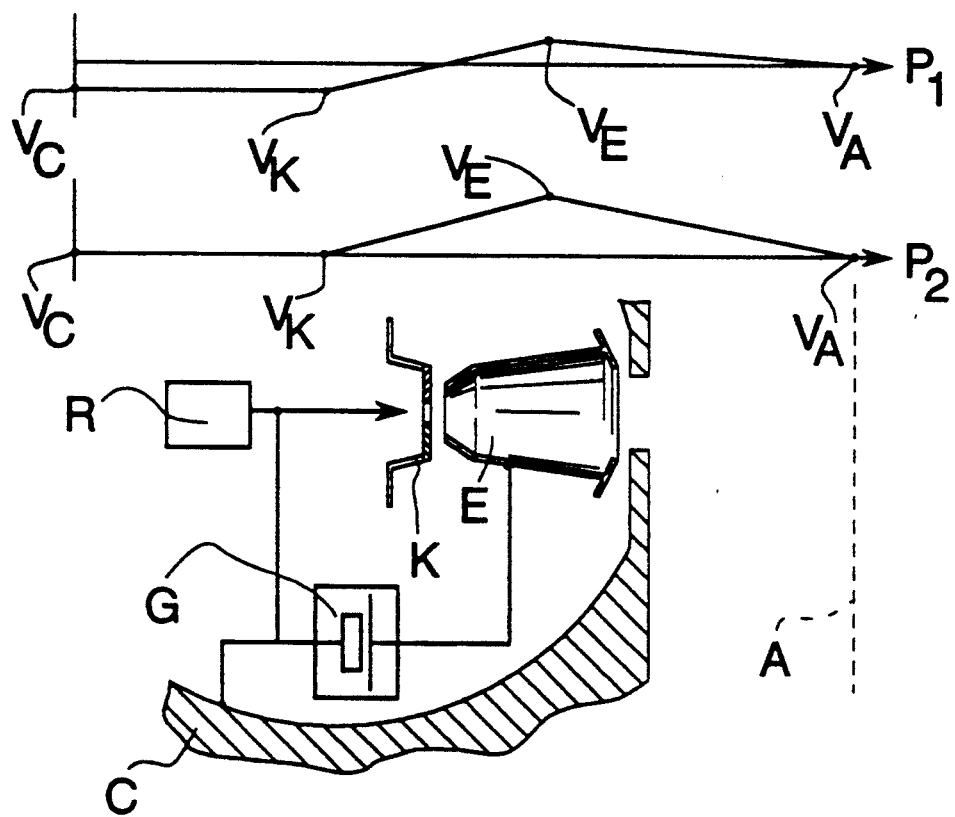
FIG. 2 is a basic configuration according to the invention.

The present invention as shown in FIG. 2 provides a direct electrical connection between cathode K and body C to be controlled (we still refer hereinbelow to a space vehicle). An accelerating voltage generator G is directly connected between accelerating electrode or electrodes E and cathode K. The invention thus provides the cathode K at vehicle C potential and the accelerating electrode or electrodes E at positive potential (the accelerating voltage) with respect to the vehicle C. In more general terms, there may be a plurality of accelerating electrodes, each one at its own positive potential with respect to the cathode.

The potential jump which affects the electrons emitted by the cathode is the potential difference between the cathode K and the final destination of said electrons. This can be surrounding environment A or some other physical entity. The effective attainment, on the part of the electron beam, of the final destination (i.e. expulsion without return to the vehicle) is thus linked to the vehicle C being at a negative potential with respect to that of the surrounding environment A. Upon the attenuation or upon the cessation of the negative potential difference (vehicle negative with respect to the environment), the expulsion of electrons (negative charges) is attenuated or interrupted; accordingly, the system described is self-regulating.

The configuration forming the subject of the present invention thus permits a prevention of the phenomena of negative charging on the part of a space vehicle, and a limitation of such phenomena during transients in which charges collected by the vehicle exceed the emissive capacity of the gun. Such functions are performed automatically by maintaining the gun in an activated condition The various services of the gun needed to be activated are the accelerating voltage generator, the heating of the cathode, and possible focusing. In the configuration described, the accelerating voltage generator supplies only the current tapped off by the accelerating electrodes (leakage) rather than the entire current emitted by the cathode. This permits the use of, for example, 10% of the power that was required in the conventional configuration, when considering a gun having an efficiency of 90% (the efficiency being understood to be the ratio between the beam current downstream of the accelerating electrodes and the current emitted by the cathode).

The use of a system configured as in the present invention is advantageous as it permits, in particular, a saving of energy and an overall saving of hardware and software resources, which is very significant in the case of space applications on account of the consequent saving in terms of energy budget and of mass, and on account of the reduction in the complexity and the consequent increased reliability.

The invention is applicable, in general, in systems comprising a body and an electron gun (together with its-services), provided that the electron gun is located under appropriate conditions of vacuum and thus, in particular, in space systems. The electrical connection between the body and the cathode of the gun may be of any length and constructed using any technology. The gun may be installed directly on the body of may be physically remote therefrom and connected to the latter via cables. In this second case, the system will tend to neutralize any possible negative potentials of the body with respect to the potential of the environment surrounding the gun or of whatever physical entity is acting as the final destination (anode) of the electron beam. The control of the potential of a body may thus be performed using an electron gun placed at a distance, forming an electrical connection between the two. In the case of a space vehicle divided into a plurality of metal parts with interposition between these of insulating materials, it will be necessary to connect to the cathode of the gun the metal part which it is desired to control. The anode may be the surrounding environment or another portion of the vehicle.

In more general terms, the anode may be a second space vehicle. The invention is applicable to systems comprising electron guns constructed using any technology. The cathode may be fitted on the body itself; in this case, there may be no need for an electrical connection. The gun may be equipped with one or more accelerating electrodes which are maintained at the same accelerating potential or at differing potentials. The selection of the accelerating potential or potentials to be applied to the pertinent electrode or electrodes determines the maximum beam current which the device is capable of emitting. There may or may not be a system for focusing the electron beam, depending upon the requirements and the particular demands imposed.

Figure 5:
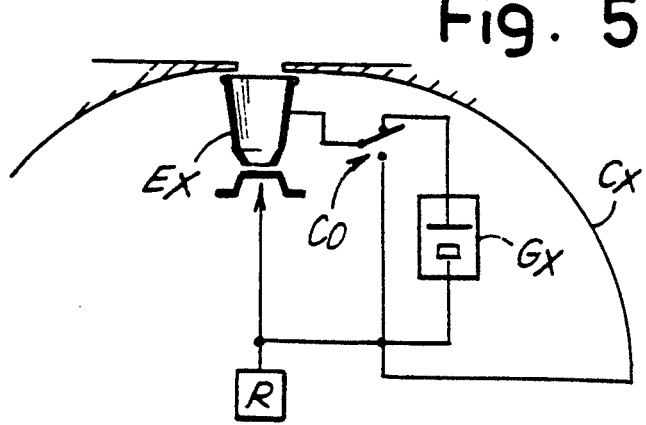
FIG. 5 is a solution with a switch.

Control of the potential of a body, in the various cases described, takes place as soon as the cathode is operative and the services of the gun have been activated. It is possible to suspend and resume the electron flow while avoiding the deactivation and reactivation of the services of the gun on each occasion, by means of a switch (CO) connected as in FIG. 5. This switches the appropriate accelerating electrode (EX) to the voltage of the generator GX or to the voltage of the body (CX), so as to permit an on-off modulation of the beam. The use of the configuration described in FIG. 5 thus permits the activation (beam ON) and the deactivation (beam OFF) of the function of controlling the potential of a body, or the performance of such a function by means of an ON-FF pulsed beam. The switch (CO) is similar to what has been provided in a co-pending application.

Figure 1:
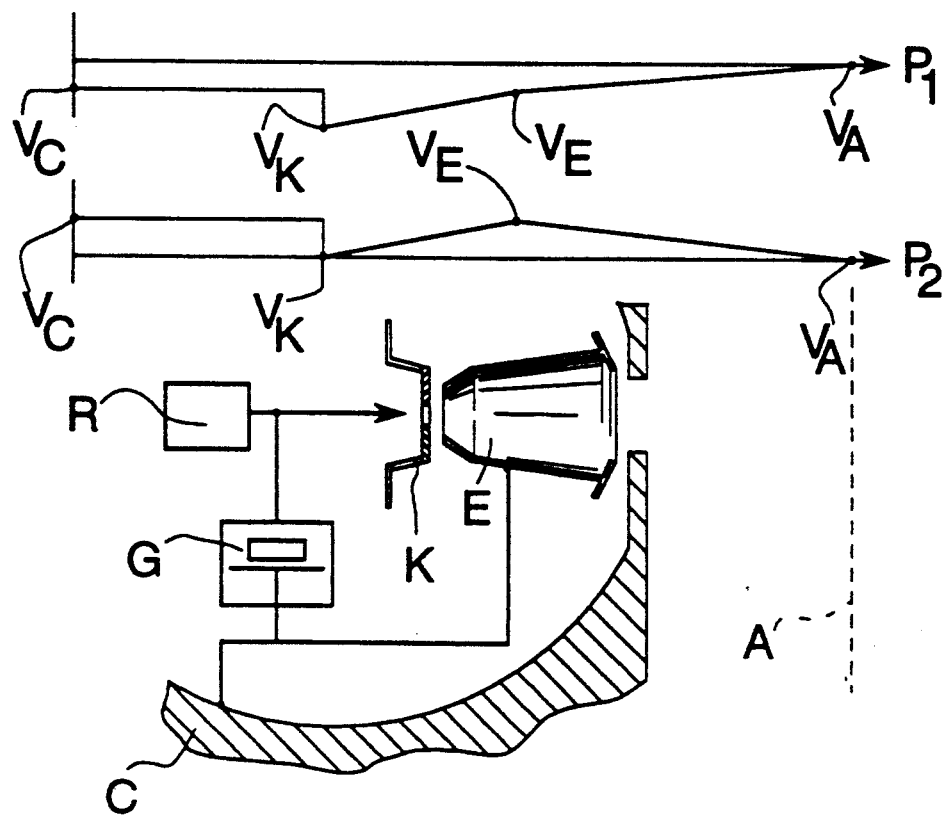
FIG. 1 is a conventional configuration.

FIG. 1 shows the configuration employed up to the present time. The heater R delivers the power required to bring the cathode K to operating temperature. The feeder G delivers the accelerating voltage $V_E - V_K$ to the accelerating electrode or electrodes E. The Abscissa $P_1$ plots the variation of the potential, while the potential of the body C is such that $V_k < V_A$. The abscissa $P_2$ plots the equilibrium situation ($V_k = V_A$): it is seen that the system tends to bring the body C to potential $V_C > V_A$.

FIG. 2 shows the configuration forming the subject of the present invention. It is seen that at the equilibrium $V_K = V_A$, and that $V_C = V_A$ also applies. The exemplification which has been made is relative to a final situation of equilibrium (abscissa $P_2$) attained from a disturbed situation (abscissa $P_1$). The function of control of the potential of the body is, in fact, performed in real time in such a manner as to prevent or at least to limit the departure of the body from the situation of equilibrium in those time intervals in which the body acquires negative charges to be discharged.

Figure 3:
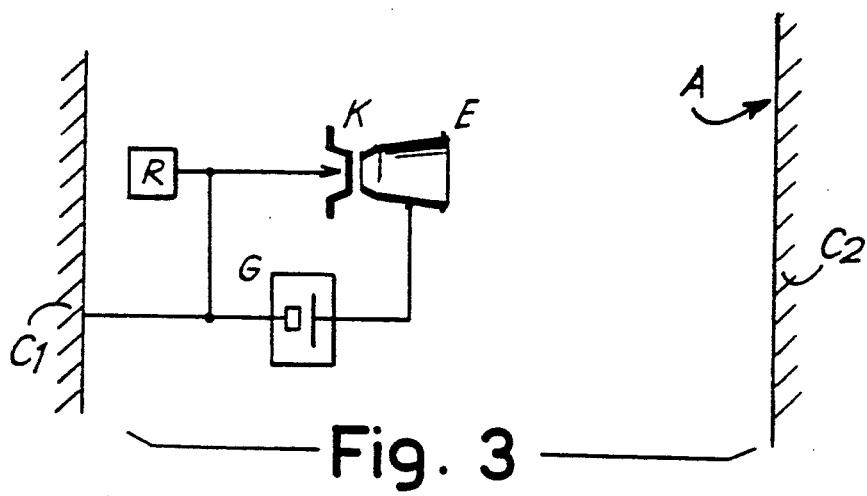
FIG. 3 is a configuration with an anode in the form of a further body.

FIG. 3 shows the case in which the anode A is the surface of a body C2 facing the gun (connected to the body C1). In this case, the condition to which the system tends, in the case where originally $V_{C1} < V_{C2}$ is satisfied, is $V_{C1} = V_{C2}$.

Figure 4:
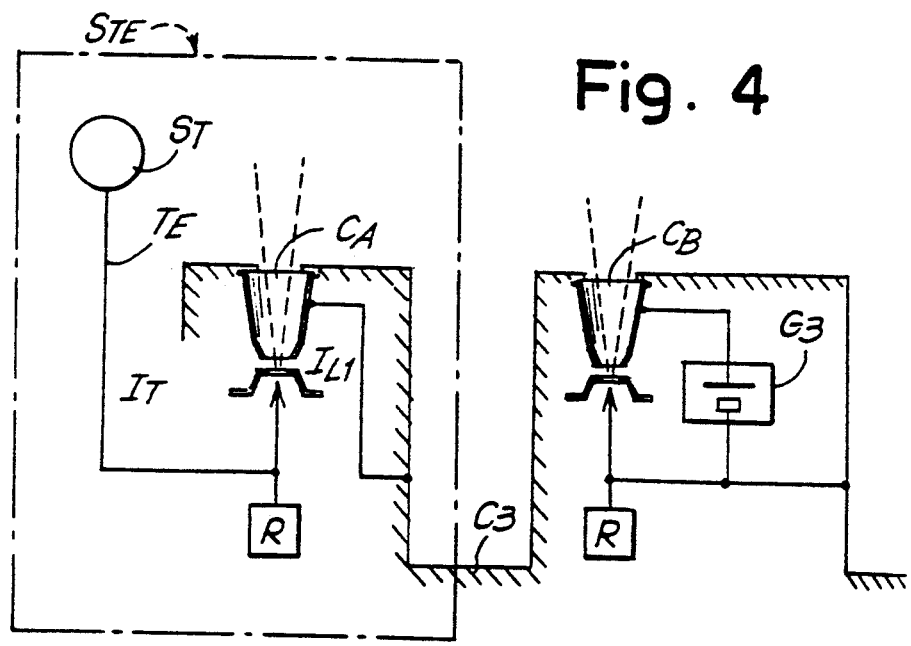
FIG. 4 is the use of the invention in a "tethered" system.

FIG. 4 shows a "tethered" system STE, consisting of a satellite ST, a vehicle C3 and a tether TE. The gun CA re-emits into the plasma the current IT which flows in the tether TE except for the part $I_{L1}$ which is tapped off by its accelerating electrodes. The latter part tends to charge the vehicle C3 negatively, crating a need for the use of a neutralizing service which may be the gun CB connected and conditioned as in the present invention with an assembly G3.

While specific embodiments of the invention have been shown and described in detail to illustrate the application of the principles of the invention, it will be understood that the invention may be embodied otherwise without departing from such principles.

I claim:

1. A device for removing a negative charge from a body, the device comprising:
   cathode means for releasing electrons, said cathode means having a cathode electrically and substantially equi-potentially connected to the body;
   electron acceleration means for moving said released electrons away from said cathode and away from the body, said electron acceleration means having an acceleration electrode spaced away from said cathode, and said electron acceleration means also having accelerating voltage means for applying an acceleration voltage between said cathode and said acceleration electrode, said accelerating voltage means applying a higher positive voltage to said acceleration electrode with respect to said cathode, said acceleration electrode having a shape and positioned relative said cathode means to cooperate with said higher positive voltage and to move said released electrons past and away from said accelerating electrode and into a surrounding environment around the body.

2. A device in accordance with claim 1, wherein:
   said cathode means has a heat generating means for forming a cloud of electrons around said cathode.

3. A device in accordance with claim 2, wherein:
   said heat generating means heats up said cathode to form said cloud of electrons.

4. A device in accordance with claim 1, wherein:
   said accelerating voltage means having a positive terminal electrically connected to said acceleration electrode, and said accelerating voltage means having a negative terminal electrically connected to both said cathode and the body; and
   said electron acceleration means substantially moving said released electrons further away from said cathode means than said acceleration electrode, said acceleration electrode not substantially receiving electrons.

5. A device in accordance with claim 1, wherein:
   the body is divided into first and second portions insulated from each other, said cathode being electrically and substantially equi-potentially connected to said first portion of the body for limiting a negative potential of said first portion of the body with respect to said second portion.

6. A device in accordance with claim 1, further comprising:
   another body spaced away from the body, said another body having an anode means for receiving said released electrons which have moved away from said cathode, said electron acceleration means limiting a negative potential of the body with respect to said another body.

7. A device in accordance with claim 1, wherein:
   said cathode means and said electron acceleration means are at a spaced distance away from the body, and said electrical and substantially equi-potentially connection to the body is by means of a cable.

8. A device for removing a negative charge from a body forming part of a tethered system, the device comprising:
   cathode means for releasing electrons, said cathode means having a cathode electrically and substantially equi-potentially connected to the body;
   electron acceleration means for moving said released electrons away from said cathode and away from the body, said electron acceleration means having an acceleration electrode spaced away from said cathode, and said electron acceleration means also having accelerating voltage means for applying an acceleration voltage between said cathode and said acceleration electrode, said accelerating voltage means applying a higher positive voltage to said acceleration electrode with respect to said cathode;
   another cathode means for releasing electrons, said another cathode means having a tether cathode electrically and substantially equi-potentially connected to a tethered portion of the tethered system;
   another electron acceleration means for moving said released electrons away from said tether cathode and away from the body, said another electron acceleration means having a tethered acceleration electrode spaced away from said tether cathode, and said another electron acceleration means also having tether accelerating voltage means for applying an acceleration voltage between said tether cathode and said tether acceleration electrode, said tether accelerating voltage means applying a higher positive voltage to said tether acceleration electrode with respect to said tether cathode.

9. A device in accordance with claim 8, wherein:
   said accelerating voltage means moves said released electrons to a surrounding environment around the body.

10. A device in accordance with claim 9, wherein:
    said accelerating voltage means having a positive terminal electrically connected to said acceleration electrode, and said accelerating voltage means having a negative terminal electrically connected to both said cathode and the body; and said electron acceleration means substantially moving said electrons past and away from said acceleration electrode, said acceleration electrode not substantially receiving electrons.

11. A device for removing a negative charge from a body, the device comprising:

cathode means for releasing electrons, said cathode means having a cathode electrically and substantially equi-potentially connected to the body;

electron acceleration means for moving said released electrons away from said cathode and away from the body, said electron acceleration means having an acceleration electrode spaced away from said cathode, and said electron acceleration means also having accelerating voltage means for applying an acceleration voltage between said cathode and said acceleration electrode, said accelerating voltage means applying a higher positive voltage to said acceleration electrode with respect to said cathode, said accelerating voltage means having a positive terminal electrically connected to said acceleration electrode, and said accelerating voltage means having a negative terminal electrically connected to both said cathode and the body, and said electron acceleration means substantially moving said electrons past and away from said acceleration electrode, said acceleration not substantially receiving electrons; and switch means for alternately connecting said acceleration electrode to said positive terminal of said accelerating voltage means in a position, and connecting said acceleration electrode to the body, said cathode and said negative terminal of said accelerating voltage means in a second position.

* * * * *